United States Patent
Gatev et al.

(10) Patent No.: US 7,937,611 B2
(45) Date of Patent: May 3, 2011

(54) METHOD, SYSTEM AND MACHINE ACCESSIBLE MEDIUM OF A RECONNECT MECHANISM IN A DISTRIBUTED SYSTEM (CLUSTER-WIDE RECONNECT MECHANISM)

(75) Inventors: Andrei A. Gatev, Sofia (BG); Peter K. Matov, Velingrad (BG); Nikolai D. Tankov, Sofia (BG)

(73) Assignee: SAP AG, Walldorf (DE)

( * ) Notice: Subject to any disclaimer, the term of this patent is extended or adjusted under 35 U.S.C. 154(b) by 383 days.

(21) Appl. No.: 11/966,846

(22) Filed: Dec. 28, 2007

(65) Prior Publication Data
US 2009/0172463 A1 Jul. 2, 2009

Related U.S. Application Data

(60) Provisional application No. 60/926,989, filed on Apr. 30, 2007.

(51) Int. Cl.
*G06F 11/00* (2006.01)
(52) U.S. Cl. ............... 714/4; 714/43; 709/203; 709/239
(58) Field of Classification Search .................. 714/4, 43
See application file for complete search history.

(56) References Cited

U.S. PATENT DOCUMENTS

| | | | | |
|---|---|---|---|---|
| 7,159,234 B1 * | 1/2007 | Murphy et al. | ................. | 725/87 |
| 7,263,554 B2 * | 8/2007 | Srivastava et al. | ............ | 709/224 |
| 7,472,313 B2 * | 12/2008 | Jiang et al. | ....................... | 714/43 |
| 7,561,512 B1 * | 7/2009 | Chellappa et al. | ............. | 370/217 |
| 2001/0034853 A1 * | 10/2001 | Takatama et al. | ................. | 714/4 |
| 2003/0221021 A1 * | 11/2003 | Kan et al. | ...................... | 709/315 |
| 2004/0054984 A1 * | 3/2004 | Chong et al. | .................. | 717/103 |
| 2004/0088413 A1 * | 5/2004 | Bhogi et al. | ................... | 709/226 |
| 2005/0262183 A1 * | 11/2005 | Colrain et al. | ................ | 709/200 |
| 2005/0273645 A1 * | 12/2005 | Satran et al. | ...................... | 714/4 |
| 2006/0114832 A1 * | 6/2006 | Hamilton et al. | ............. | 370/244 |
| 2006/0146877 A1 * | 7/2006 | Srivastava | ..................... | 370/469 |
| 2006/0173866 A1 * | 8/2006 | Newport | ........................ | 707/100 |
| 2006/0190602 A1 * | 8/2006 | Canali et al. | .................. | 709/226 |
| 2006/0236378 A1 * | 10/2006 | Burshan | ........................... | 726/4 |
| 2007/0174729 A1 * | 7/2007 | Jiang et al. | ...................... | 714/43 |
| 2007/0198524 A1 * | 8/2007 | Branda et al. | .................. | 707/10 |
| 2007/0268910 A1 * | 11/2007 | Shen et al. | ............... | 370/395.21 |
| 2008/0016387 A1 * | 1/2008 | Bensinger | .......................... | 714/4 |

* cited by examiner

*Primary Examiner* — Scott T Baderman
*Assistant Examiner* — Chae Ko

(57) ABSTRACT

A method, system and machine accessible medium for validating a plurality of connections to a backend in a distributed system. A connection request requiring access to a backend is processed at a first node of a distributed system. The access to the backend enabled through a connection from a plurality of connections on the first node. The plurality of connections on the first node is validated in response to a connection request failure. A plurality of connections on a second node is validated in response to the connection request failure.

20 Claims, 3 Drawing Sheets

METHOD, SYSTEM AND MACHINE ACCESSIBLE MEDIUM OF A RECONNECT MECHANISM IN A DISTRIBUTED SYSTEM (CLUSTER-WIDE RECONNECT MECHANISM)

This application claims the priority of U.S. Provisional Patent Application No. 60/926,989, filed Apr. 30, 2007.

FIELD OF INVENTION

Embodiments of the invention relate generally to distributed system connectivity, and, more specifically, to connectivity maintenance in distributed system environment.

BACKGROUND

Distributed system is the predominant architecture of Information Technologies (IT) systems for running software applications in the recent years. There are many definitions for distributed system and all of them share one characterizing element—a plurality of nodes where a software application is executed. The nodes are usually separate servers, similar in configuration, communicating with each other. In one of the possible distributed system implementation scenarios, the plurality of server nodes are combined in a cluster.

In general, distributed systems provide an environment for executing an application to process various user requests, sent by a number of users through different kinds of client applications, including web browsers. Usually, processing a user request requires access to a backend system ("backend" for short). Hence, a distributed system has to be connected to and has to communicate with a backend system. For that reason, on each server node, where a connection request could be processed, a communication framework to provide access to one or more backend systems is implemented. Examples of backend systems include databases, middleware messaging systems, legacy enterprise systems, etc.

When the software application processes a connection request that needs to access a backend, the connection framework creates a connection object, or simply a connection, to logically handle the physical link between the application and the backend. After the connection request is completed, the connection framework destroys the connection. However, the creation of an exclusive connection per connection request is not resource efficient. Therefore, it is preferable for the connection framework to create and maintain a set of reusable connections to a backend. Thus, a connection is created once and used many times to provide access to a backend for a plurality of connection requests.

During runtime it is possible for a connection to a backend to become invalid. Many reasons may cause invalidation of a connection, e.g. the backend is down, power instability, network failure, timeout events, etc. The invalid connection cannot be reused, even if the cause for invalidation is eliminated (the backend is up again, the network is fixed, etc.), because the logical relationship with the backend once broken cannot be reestablished. Hence, if a connection is not valid, it has to be destroyed. However, generally the identification and destruction of such invalid connections only occurs when that connection is requested and determined to be invalid.

SUMMARY

A method, system and machine accessible medium for validating a plurality of connections to a backend in a distributed system is described. A connection request requiring access to a backend is processed at a first node of a distributed system. The access to the backend enabled through a connection from a plurality of connections on the first node. The plurality of connections on the first node is validated in response to a connection request failure. A plurality of connections on a second node is validated in response to the connection request failure.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of a method, system and machine accessible medium for validating pluralities of connections to a backend in a distributed system are described herein.

As used herein, the term "connection" means a reusable connection object created in a server node by a connection framework to provide access to a backend. The term "connection request" means a request for accessing a backend. Such request is usually generated by an application when processing a task initiated by a user. A connection request is routed to the backend through a connection. On a single node of a distributed system a number of connections could be created and maintained to process a number of connection requests simultaneously. The term "process" means a sequence of related activities carried out to achieve a specific purpose. The term "validation process" means a process aimed to validate a plurality of connections in a distributed system.

Embodiments of the invention create a plurality of reusable connections to a backend in a number of nodes in a distributed system. On each of the nodes tasks that require access to the backend may be processed. These connection requests are routed through reusable connections. The plurality of reusable connections on a node is validated, e.g. the reusable connections disabled for any reason are deleted, in response to a connection request failure. The pluralities of reusable connections on the rest of the nodes in the distributed system are validated in response of the connection request failure.

Figure 1:
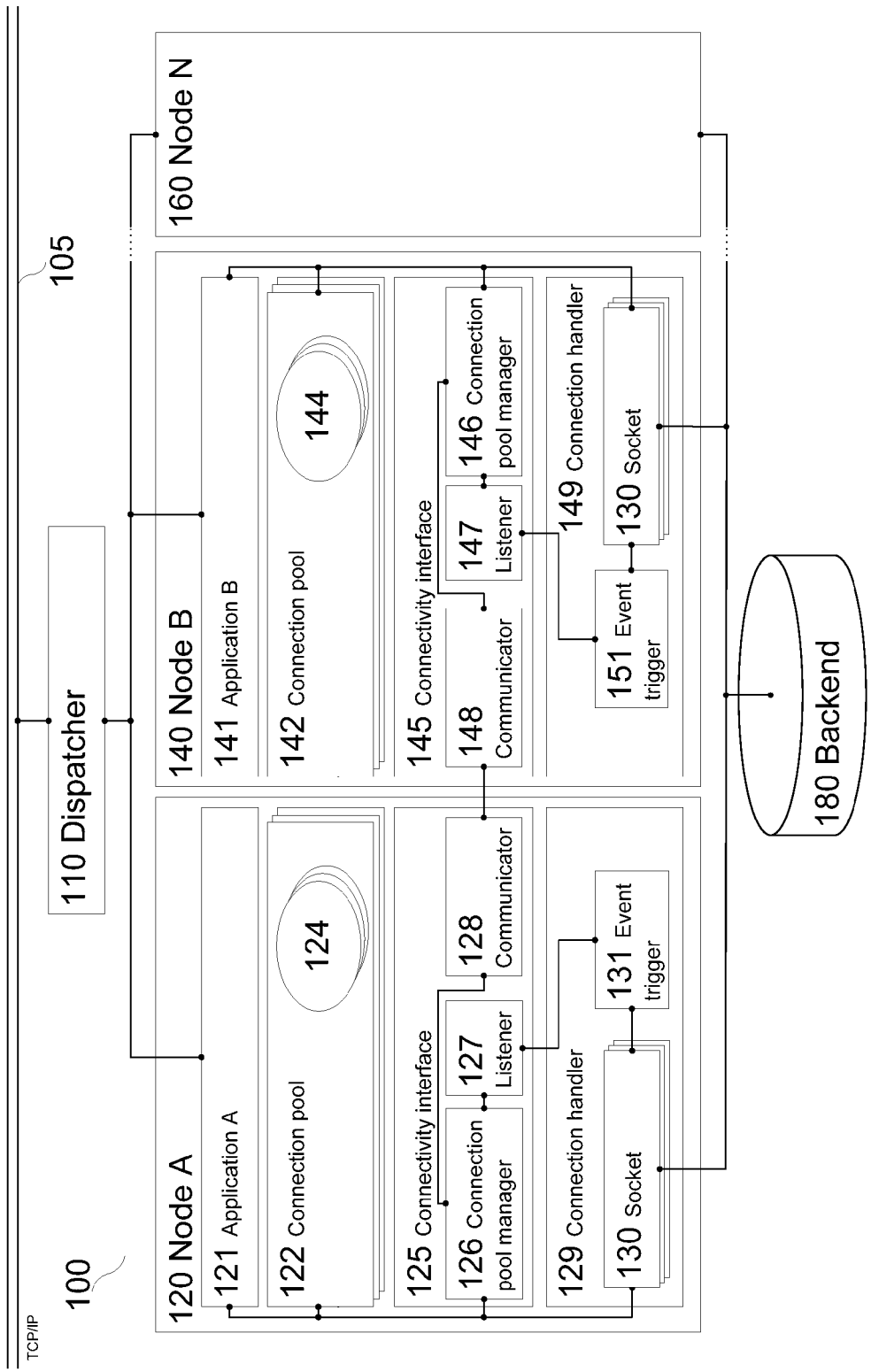
FIG. 1 illustrates a block diagram of a distributed system having a mechanism for validating a plurality of connections to a backend according to one embodiment of the invention.

FIG. 1 is a block diagram of distributed system 100 where a mechanism for validating a plurality of connections to a backend according to one embodiment of the invention is implemented. Node A 120, node B 140 and node N 160 are separate server nodes in distributed system 100 with similar configuration where business applications are executed. Node N 160 is not illustrated in further detail but reflects that the number of nodes in the system may be arbitrarily large.

Business applications that run on distributed system 100 perform tasks in accordance with user requirements. Generally, user requirements or user application requests are sent to distributed system 100 through network. 105 from multiple users using various client systems, e.g. client applications, internet browsers, handheld device interfaces, etc. The incoming application requests are distributed among the nodes in distributed system 100 by dispatcher 110 in accordance with their specifics or the load of the nodes 120,140, 160.

Application A 121 is executed at node A 120 and respectively application B 141 is executed at node B 140. In one embodiment of the invention application A 121 and application B 141 are copies of one business application running on separate nodes in distributed system 100. The nodes in distributed system 100 are connected to a plurality of backends, illustrated with backend 180. Backend 180 is a third party endpoint, for example database, legacy enterprise system, messaging middleware system, etc. The applications running on distributed system 100 access backend 180 to process user requests.

Connection pool 122, connectivity interface 125 and connection handler 129 are the basic units of a communication framework providing access to the plurality of backends for the applications running on node A 120. Connection pool 122 represents a plurality of connection pool modules corresponding to one or more backends with which distributed system 100 is in communication. Each connection pool 122 may hold a plurality of connections 124 to be used by the applications for accessing the corresponding backend. Connection pool 122 is created and maintained by connectivity interface 125, more specifically by connection pool manager 126 in accordance with applications and other services requirements.

When an initial connection request to a backend is processed, new connection 124 is generated to route the access to the backend. New connection 124 might also be generated if no free connection 124 exists to handle a current connection request. A predefined number of connections 124 per data source or per connection pool 122 could be maintained. In some embodiments, the predefined number of connections 124 to a backend 180 might be created with data source establishment, without waiting for connection requests. Connection 124 might be destroyed or deleted when it is disabled for some reason, e.g. timeout event, lost backend, etc. Disabled or invalid connections are those connections which are no longer able to provide access to the backend.

Connection 124 provides application 121 standardized access to backend 180 in accordance with backend technology specifics. At system platform level, connection 124 is linked to backend 180 through socket 130. Separate socket 130 for each connection 124 might be required. Connection handler module 129 is responsible for the lifecycles of connection 124 and socket 130.

Connection handler 129 includes event trigger 131. Event trigger 131 fires an event when connection request execution fails due to a connect error, e.g. a disabled connection or broken socket. The event is received by listener 127 in connectivity interface 125, and connection pool manager 126 validates connection pool 122. Through the validation all invalid connections 124 and respective sockets 130 are destroyed.

Further, connectivity interface 125 notifies the connection pool managers at the rest of the nodes 140,160 in distributed system 100 to validate connections residing on those nodes 140,160. Notification may be initialized by connection pool manager 126 and communicated to the other nodes 140, 160 through communicator 128.

Node B 140 resembles the structure and interoperability of node A 120 comprising the same set of communication framework elements: a plurality of connection pool 142 modules holding connections 144; connectivity interface 145 including connection pool manager 146, listener 147 and communicator 148; and connection handler 149 including sockets 150 and event trigger 151. In one embodiment, the rest of the nodes in distributed system 100 e.g. node N 160 may be configured the same as node A 120 and node B 140.

Figure 2:
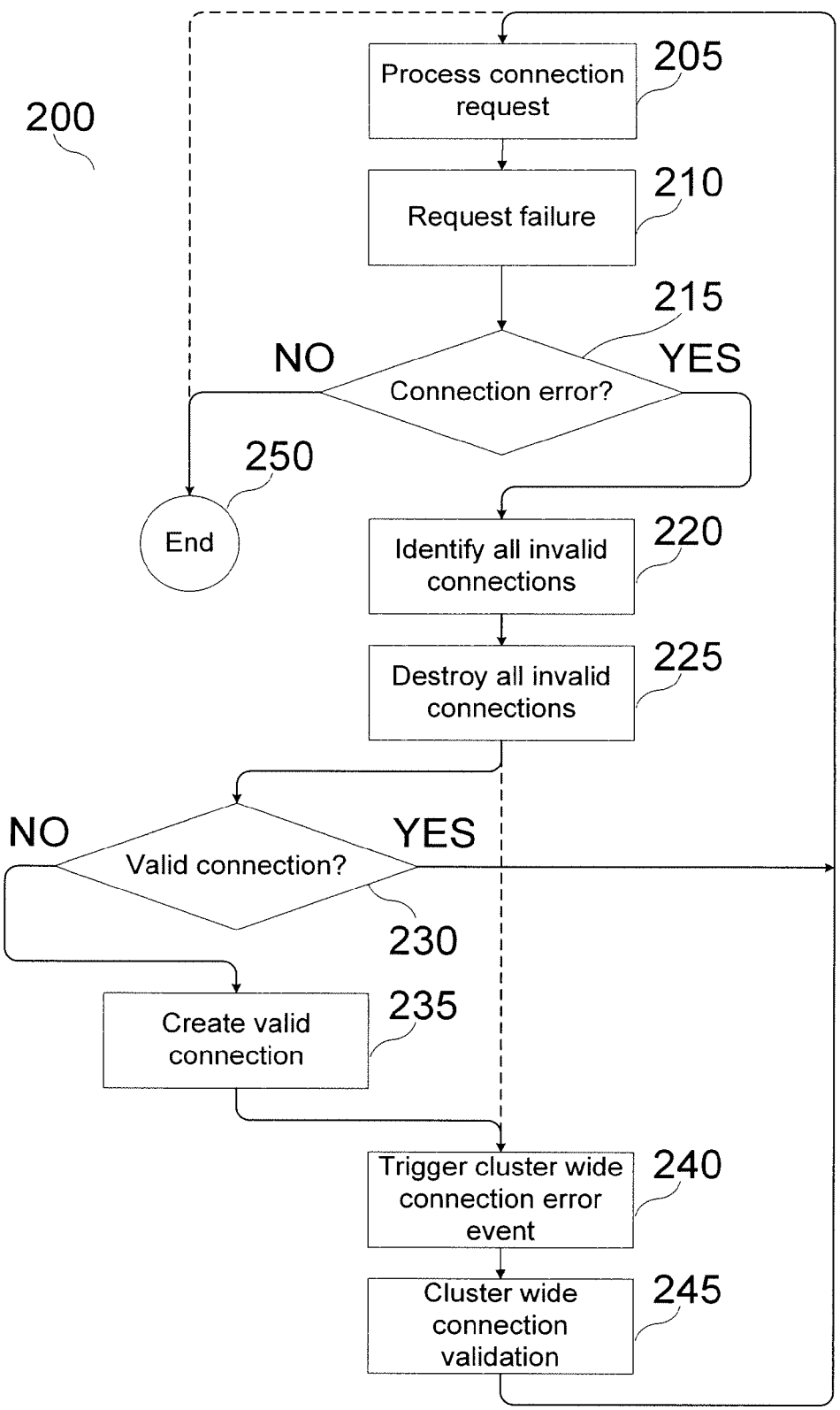
FIG. 2 illustrates a flowchart of a process to validate a plurality of connections to a backend in a distributed system according to one embodiment of the invention.

FIG. 2 is a flowchart of a validating process according to one embodiment of the invention. The process starts with processing connection request at block 205. For example, application 121 at node A 120 processes connection request which requires access to backend 180, the request is routed through connection 124 and socket 130. Block 210 illustrates that connection request execution fails for some reason. Different reasons for connection requests failure are possible. Therefore, at bock 215 the validation process checks whether the connection failure is due to a disabled connection or a broken socket. In distributed system 100 connection handler 129 is aware when connection request fails due to problems with either connection 124 or socket 130. When the request fails not because of a problem with the connection or socket, validation process ends at block 250. Otherwise, event trigger 131 fires an event indicative for connection error. The event is received by listener 127 who notifies connection pool manager 126 to validate connection pool 122. Validation of connection pool starts with identifying all invalid connections at block 220. Then, all identified invalid connections and the respective sockets are destroyed at block 225.

In one embodiment of the invention the validation process continues with checking if there are valid connections left— block 230. If there are, it could be presumed that the problem is local for the node and with that the validation process ends at block 250 or goes back to connection request processing at block 205. However, if there are no connections left, i.e. all connections were invalid, and respectively deleted, the connection problem is likely to affect all nodes of the distributed system. Therefore, validation process continues at block 240 with notifying the rest of the nodes of the distributed system to perform at block 245 connection validation. In another embodiment, the validation process after block 225 may directly continue at block 240, without checking whether valid connections remain. Validation process ends at block 250 or goes back to connection request processing at block 205 after connection validation in all nodes of the distributed system.

As described above, in distributed system 100 connection pool manager 126 uses communicator 128 to notify the rest of the nodes 140,160 of the connection request failure event. In one embodiment of the invention the notification may be executed in a form of a cluster wide triggered event. In another embodiment a messaging server could be utilized to spread the message within the distributed system.

In one embodiment of the invention at, block 235 a new valid connection could be created if the backend is accessible to handle the next connection request. The new connection could be used to handle the access to the backend for the same task that had generated the failed connection request. In this case, it is not necessary to cancel the task because the first connection request failed.

An advantageous embodiment of the invention employs distributed application system architecture in which the plurality of server nodes is configured as a cluster. In the cluster each node has the same configuration and executes copies of a same set of business applications. By using cluster architecture the distributed system provides parallel computing capabilities and high availability. In one embodiment of the invention the distributed system is built on Java technology and more specifically using Java Enterprise Edition (JEE) developed by Sun Microsystems Inc. In another embodiment the distributed system may be built using different technology, e.g. .Net technology, developed by Microsoft Corporation. The embodiments of the invention provide the advantage of validating the connections at all nodes in response of a single connection request failure on one node.

Figure 3:
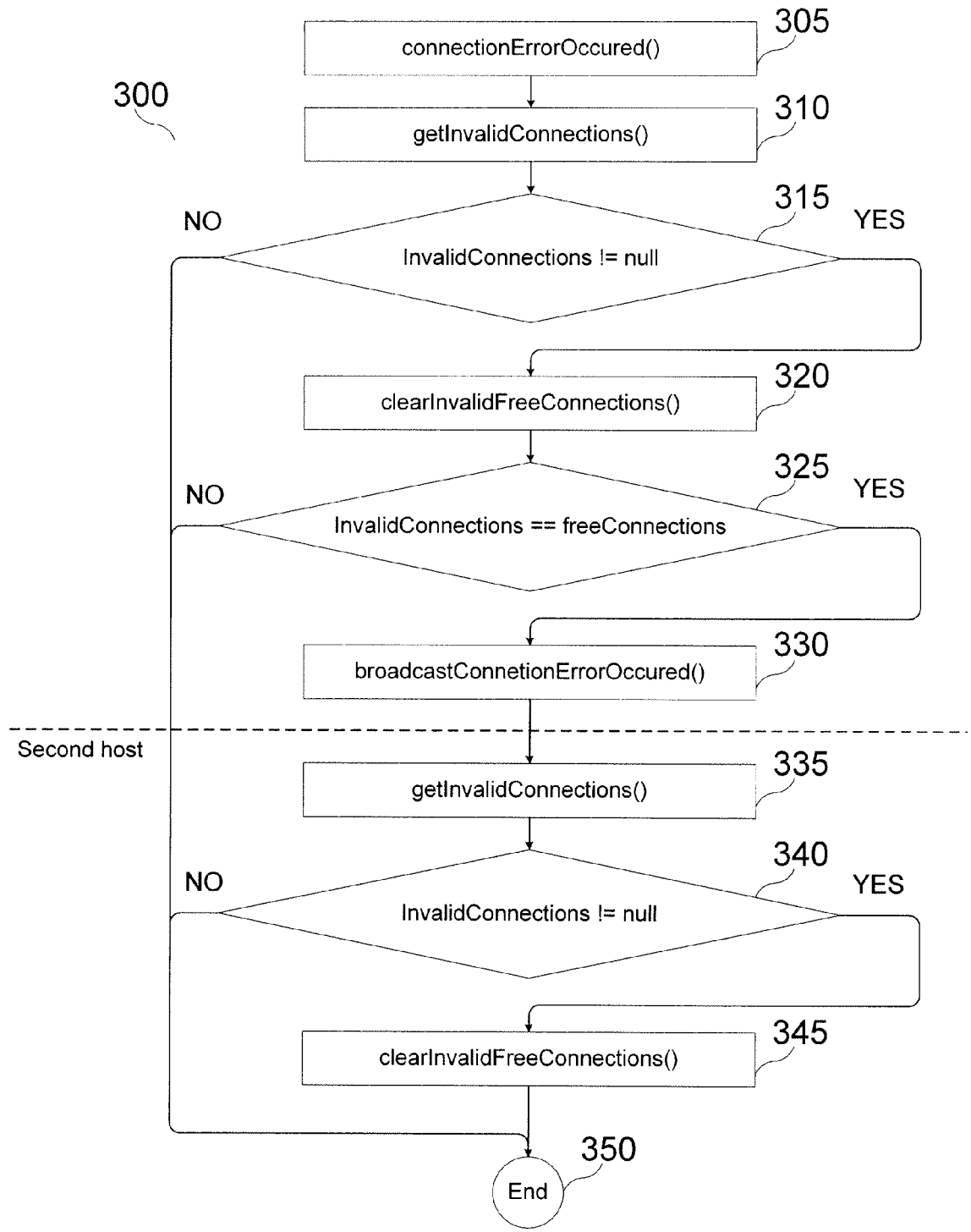
FIG. 3 illustrates a flowchart of a process to validate a plurality of connections to a backend in a distributed system built with Java cluster technology according to one embodiment of the invention.

FIG. 3 is a flow diagram of the validation process in a Java implementation of one embodiment of the invention. In case distributed system 100 is implemented following the JEE specification, server nodes 120, 140 and 160 might be configured as JEE application servers. An embodiment of the invention may employ a set of standard and specifically developed interfaces and methods of JEE application server. The names of methods, events and variables, as shown in FIG. 3 may differ in another embodiment of the invention using Java technology.

At block 305 connection handler 129 fires a connection error event when a connection request to backend 180 fails due to connect error. In one embodiment of the invention connection handler 129 may be implemented as a Java Database Connectivity (JDBC) driver for connecting to a database endpoint in accordance with JEE specification. JDBC driver triggers event with connectionErrorOccurred( ) method on ConnectionEventLitener interface. According to JEE platform specification, connectionErrorOccurred( ) method notifies ConnectionEventListener interface that a fatal error has occurred and the pooled connection can no longer be used. The ConnectionEventListener interface is implemented by a connection pooling component. A connection pooling component will usually be provided by a JDBC driver vendor or another system software vendor. Another JEE server components for connecting to other kind of backend systems also could be used, i.e. Java message service (JMS) library for connecting to Java messaging system, or a Resource Adapter for connecting to legacy enterprise systems.

At block 305 connectivity interface 125 receives connectionErrorOccurred( ) and detects all invalid connections in connection pool 122 at block 310. In JEE, connectivity interface is implemented with Connector Service—the JEE component that manages the overall connectivity to backend resource systems. In version 1.5 of JEE Connector Architecture (JCA) specification is introduced ValidatingManagedConnectionFactory interface providing getInvalidConnection( ) method. This method receives a set of connections that need to be validated and returns a set of invalid connections.

At block 315 validation process checks if the set of invalid connections is not empty to verify that invalid connections exist in connection pool 122. If empty, the validation process ends at block 350, otherwise the JEE application server cleans the invalid connections. An exemplary method clearInvalidFreeConnections( ) illustrated at block 320 is called to clean the invalid connections. In JEE specification exist different methods for resource cleanup, for example clearInvalidFreeConnections( ) may call destroy( ) method to remove a connection from the pool. All these tasks are performed at Resource Pool, part of JCA.

After the invalid connections are cleared, Resource pool 122 checks at block 325 whether the number of the invalid connections equals the number of all connections in the pool. When the number of all connections is greater, there are valid connections in the pool, which indicates a local connection problem and the validation process ends at block 350. When the numbers are equal, presumably all connections to backend 180 are invalid and validation process continues at block 330 where connector 125 notifies the rest of the nodes in distributed system 100 of the connection failure using broadcastConnectionErrorOccurred( ) method. This notification mechanism is an enhancement to the JEE specification provided by SAP AG company. Alternatively, an existing inter cluster notification mechanism provided by another vendor may be applied.

Blocks 335 through 345 repeat the actions of blocks 310 through 320 on node B 140 of distributed system 100. The same actions are executed on all nodes in distributed system 100, including node N 160.

Elements of embodiments may also be provided as a machine-readable medium for tangibly storing the machine-executable instructions. The machine-readable medium may include, but is not limited to, flash memory, optical disks, CD-ROMs, DVD ROMs, RAMs, EPROMs, EEPROMs, magnetic or optical cares, propagation media or other type of manufactured machine-readable media articles suitable for storing electronic instructions.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for validating access to a backend system in a distributed computer system comprising:
maintaining a first pool of reusable connections in a first server of the distributed computer system, wherein each connection from the first pool of reusable connections provides access to the backend system linked to the distributed computer system via a network for at least one application executed at the first server;
generating a connection request by an application executed at the first server for accessing the backend system;
detecting failure of the connection request due to a connection error at the first server of the distributed computer system, wherein the error indicates an invalid connection in the first pool of reusable connections;
removing a set of invalid connections from the first pool of reusable connections responsive to the connection error; and
triggering a validation of a second pool of reusable connections at a second server of the distributed computer system responsive to the connection error, wherein each connection from the second pool of reusable connections provides access to the backend system for at least one application executed at the second server.

2. The method of claim 1 wherein generating the connection request by the application executed at the first server comprises:
receiving an application request from a user at the first server executing the application, wherein the application accesses the backend system to process the application request; and routing an access to the backend system through a connection from the first pool of reusable connections providing access to the backend system at the first server.

3. The method of claim 1, wherein removing the set of invalid connections from the first pool of reusable connections at the first server comprises:
identifying at least one invalid connection from the first pool of reusable connections by calling a connectivity framework method for connections validity check in the first server, wherein the method for connections validity check receives a set of connections to be validated from the first pool of reusable connections and returns the at least one invalid connection; and
destroying the identified at least one invalid connection by calling a resource cleanup method in the first server.

4. The method of claim 1 further comprising:
creating a new connection in the first pool of reusable connections providing access to the backend system responsive to the connection error.

5. The method of claim 1, wherein triggering the validation of the second pool of reusable connections at the second server comprises:
sending a notification message to the second server using a notification mechanism provided in the distributed computer system, the message indicative of the connection error detected at the first server.

6. The method of claim 1, wherein triggering the validation of the second pool of reusable connections at the second server comprises:
sending a notification message to the second server using a notification mechanism provided in the distributed computer system when there is no valid connection in the first pool of reusable connections providing access to the backend system on the first server.

7. The method of claim 1 further comprising:
receiving a notification message from a third server of the distributed computer system, the message indicative for a connection error to the backend system for an application executed at the third server; and
removing at least one invalid connection from the first pool of reusable connections responsive to the notification message.

8. The method of claim 1 further comprising:
generating a new connection request by the application executed at the first server for accessing the backend system when the validation of the second pool of reusable connections has been triggered.

9. A system for validating access to a backend system comprising:
a memory to store program code; and
a processor coupled with the memory and configured to execute the program code stored in the memory to
maintain a first pool of reusable connections in the first server node,
wherein each connection of the first pool of reusable connections provides access to the backend system for at least one application executed at the first server node,
generate a connection request by an application executed at the first server node for accessing the backend system;
detect failure of the connection request due to a connection error indicating an invalid reusable connection in the first pool of reusable connections,
validate a plurality of connections of the first pool of reusable connections responsive to the connection error, and
trigger a validation of a second pool of reusable connections at a second server node of the distributed computer system responsive to the connection error, wherein each connection from the second pool of reusable connections provides access to the backend system for at least one application executed at the second server node.

10. The system of claim 9, wherein the memory further comprises:
a connection handler program code configured to maintain lifecycle of each connection from the first pool of reusable connections and to logically link the connections with the backend system.

11. The system of claim 9, wherein the memory further comprises:
a socket program code configured to link a connection from the first pool of reusable connections with the backend system on a system platform level; and
an event trigger program code to trigger an event indicative of the failed connection request for access to the backend system for the application.

12. The system of claim 9, wherein the memory further comprises:
a connectivity framework method program code to check validity of the plurality of connections from the first pool of reusable connections simultaneously, wherein the connectivity framework method program code receives the plurality of connections and returns at least one invalid connection.

13. The system of claim 9 wherein the memory further comprising:
a listener program code to receive an event indicative for the failed connection request for access to the backend system for an application; and
a connection pool manager program code to create a connection pool.

14. The system of claim 9, wherein the memory further comprises:
a communicator program code to send a message to the second server node indicative of the connection error.

15. A non-transitory machine readable medium having instructions tangibly stored therein which when executed cause a machine to perform a set of operations comprising:
maintaining a first pool of reusable connections in a first server of a distributed computer system, wherein each connection from the first pool of reusable connections provides access to a backend system linked to the distributed computer system via a network for at least one connection request processed at the first server of the distributed computer system;
detecting a connection error at the first server of the distributed computer system, wherein the connection error indicates failure of a connection request;
removing at least one invalid connection from the first pool of reusable connections responsive to the connection error; and
triggering a validation of a second pool of reusable connections at a second server of the distributed computer system responsive to the connection error, wherein each connection from the second pool of reusable connections provides access to the backend system for at least one connection request processed at the second server.

16. The machine readable medium of claim 15 wherein detecting the connection error at the first server comprises:
generating a connection request by an application executed at the first server to access data in the backend system; and routing the connection request through a connection from the first pool of reusable connections providing access to the backend system at the first server.

17. The machine readable medium of claim 15, wherein removing the at least one invalid connection from the first pool of reusable connections at the first server comprises:

identifying simultaneously a set of invalid connections from the first pool of reusable connections providing access to the backend system; and destroying the identified set of invalid connections.

18. The machine readable medium of claim 15, having further instructions tangibly stored therein which when executed cause a machine to perform a set of operations further comprising:

creating a valid connection at the first server providing access to the backend system when no valid connection exists in the first pool of reusable connections and the backend system is accessible.

19. The machine readable medium of claim 15, wherein triggering validation of the plurality of connections at the second server comprises:

sending a message to the second server, the message indicative of the error detected in the first server.

20. The machine readable medium of claim 15, wherein triggering the validation of the second pool of reusable connections at the second server comprises:

sending a message to the second server when there is no valid connection in the first pool of reusable connections providing access to the backend system on the first server.

* * * * *